United States Patent
Maier, Jr. et al.

(10) Patent No.: US 7,398,431 B2
(45) Date of Patent: Jul. 8, 2008

(54) SYSTEM AND METHOD OF DYNAMICALLY SETTING A FAULT THRESHOLD FOR AN OPERATIONAL MODULE

(75) Inventors: Paul H. Maier, Jr., Athol, MA (US); Phillip J. Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 659 days.

(21) Appl. No.: 11/017,292

(22) Filed: Dec. 20, 2004

(65) Prior Publication Data

US 2006/0143519 A1    Jun. 29, 2006

(51) Int. Cl.
*G06F 11/00* (2006.01)
(52) U.S. Cl. ......................................... 714/48; 714/721
(58) Field of Classification Search ................. 714/47, 714/48, 25, 721; 702/57, 55, 65
See application file for complete search history.

(56) References Cited

U.S. PATENT DOCUMENTS

| | | | | |
|---|---|---|---|---|
| 6,049,888 A | * | 4/2000 | Chanoux | 714/4 |
| 6,064,501 A | * | 5/2000 | Roberts et al. | 398/11 |
| 6,176,272 B1 | * | 1/2001 | Wahhoud et al. | 139/452 |
| 6,754,593 B1 | * | 6/2004 | Stewart et al. | 702/35 |

* cited by examiner

*Primary Examiner*—Dieu-Minh Le
(74) *Attorney, Agent, or Firm*—Guerin & Rodriguez, LLP; Michael A. Rodriguez (57) ABSTRACT

A system and method for determining a fault threshold for an operational module according to the model of the operational module are described. The system includes an operational module, a storage unit, and a monitoring unit. The operational module has circuitry for producing a characterization signal with an electrical characteristic that uniquely correlates to the model of the operational module. A storage unit maintains an association between at least one parameter value and a fault threshold. A monitoring unit is in communication with the operational module to receive the characterization signal and with the storage unit. The monitoring unit measures the electrical characteristic of the characterization signal to derive a parameter value therefrom and accesses the storage unit to determine the fault threshold associated with the derived parameter value.

24 Claims, 5 Drawing Sheets

|  | CHARACTERISTIC (AMPLITUDE) | FAULT THRESHOLD |
|---|---|---|
| 54-1 | 1.35 V | 700 RPM |
| 54-2 | 2.80 V | 700 RPM |
| 54-3 | 2.90 V | 1700 RPM |
| 54-4 | 4.90 V | 1700 RPM |
| 54-5 | 5.00 V | 1000 RPM |
| 54-6 | 7.2 V | 1000 RPM |
| 54-7 | 7.5 V | 1500 RPM |
| 54-8 | 10.0 V | 1500 RPM |

SYSTEM AND METHOD OF DYNAMICALLY SETTING A FAULT THRESHOLD FOR AN OPERATIONAL MODULE

FIELD OF THE INVENTION

The invention relates to electronic systems with operational modules. More specifically, the invention relates to a system and method of dynamically setting a fault threshold for an operational module based on its manufacturer or on its operational characteristics.

BACKGROUND

Cooling and temperature control in electrical, optical, and mechanical systems is of primary importance to the proper operation of such systems. Consequently, it is vital to replace a degrading or failed cooling module (e.g., blowers and fans) as quickly as possible in order to maintain normal system operation. In general, the replacement module can be from a different manufacturer than the manufacturer of the cooling module that is now degrading or failing. However, the ability to use cooling modules from different manufacturers can present a problem for fault detection.

Cooling modules produced by different manufacturers can operate at different rotational rates and still produce similar airflow volumes. Systems may use rotational rate as an indication of whether the cooling module is performing properly, degrading, or failing. The acceptable rotational rate, however, for a properly functioning cooling module can vary from manufacturer to manufacturer. Often, a single rotational rate serves as a fault threshold for all cooling modules that presently are or may become installed in the system. Typically, this fault threshold accounts for the slowest speed module from among the various manufacturers that might be used in the system; otherwise, if the fault threshold is set too high, properly functioning modules can erroneously trigger a fault or failure condition. Setting the fault threshold based on the slowest speed module, however, enables higher-speed cooling modules to degrade undetected to unacceptable performance levels because the rotational rate of the degrading module still happens to be above the fault threshold. The presence of a degrading cooling module can place a strain upon the continued operation of the system. Thus, there is a need for a system and method for setting fault thresholds that can accommodate operational modules from different manufacturers without the above-mentioned disadvantages associated with using a single fault threshold.

SUMMARY

In one aspect, the invention features a system for determining a fault threshold of an operational module according to a model of the operational module. The system includes an operational module, a storage unit, and a monitoring unit. The operational module has circuitry for producing a characterization signal with an electrical characteristic that uniquely correlates to the model of the operational module. The storage unit maintains an association between at least one parameter value and a fault threshold. The monitoring unit is in communication with the operational module to receive the characterization signal and with the storage unit. The monitoring unit measures the electrical characteristic of the characterization signal to derive a parameter value therefrom and accesses the storage unit to determine the fault threshold associated with the derived parameter value.

In another aspect, the invention features a method of determining a fault threshold of an operational module according to a model of the operational module. The method includes producing, by the operational module, a characterization signal having an electrical characteristic that uniquely correlates to the model of the operational module. An association between at least one parameter value and a fault threshold is maintained. The electrical characteristic of the characterization signal is measured to derive a parameter value therefrom. The fault threshold associated with the derived parameter value is determined. This becomes the fault threshold for the operational module.

In yet another aspect, the invention features an apparatus for determining a fault threshold of an operational module according to a model of the operational module. The apparatus includes means for producing a characterization signal with an electrical characteristic that uniquely correlates to the model of the operational module, means for maintaining an association between at least one parameter value and a fault threshold, means for measuring the electrical characteristic of the characterization signal to derive a parameter value therefrom, and means for accessing the storage unit to determine the fault threshold associated with the derived parameter value.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

As a general overview, the invention relates to a system and method for dynamically determining a fault threshold for an operational module based upon the specific production model of the operational module. In the course of its operation, the operational module produces an output signal. A monitoring unit receives and uses the output signal to gauge the current performance or operational status of the operational module. From this output signal, the monitoring unit can generally determine if the operational module is functioning properly, degrading, or failing, as described further below.

In accordance with the principles of the invention, the operational module includes circuitry that modifies the output signal (e.g., its amplitude). The type of electrical component (s) used in this circuitry, e.g., a resistor and its particular value, or a Zener diode and its particular value, depends upon the manufacturer of the operational module. As used herein, two resistors, for example, having different values are considered to be different types of electrical components. Different manufacturers are assigned different electrical components. Similarly, if the same manufacturer makes different production models or versions of operational modules, each version can be assigned a different electrical component. The different electrical components produce different effects on the generated output signals. As a result, the output signal produced and modified by the operational module of one manufacturer differs from the output signal produced and modified by the operational module of another manufacturer. The modified output signal received from an operational module can thus serve as an indicator of its manufacturer or of its model. In addition to determining its manufacturer, the monitoring unit may also be able to determine the current performance of the operational module from the modified output signal.

A storage unit maintains associations, e.g., in a table, between various parameter values (or ranges of parameter values) and fault thresholds. Each parameter value (e.g., 5 volts) corresponds to a measurement of a particular electrical characteristic (e.g., amplitude) of the modified output signal. Each parameter value also corresponds to a particular model of operational module manufactured by a particular manufacturer. That is, only one model of operational module, made by one or more manufacturers, produces a modified output signal with an electrical characteristic that measures equal to a given parameter value or within a given range of parameter values.

In addition, each type of operational module has a predetermined, specified fault threshold. A fault threshold for an operational module defines a level of performance below which the operational module is deemed degrading or failing. For each parameter value, or range of parameter values, there is an associated fault threshold. The type of operational modules currently installed in a system may vary from time to time, for example, because of field service replacements. Thus, a fault threshold is dynamically determined for each operational module in the system based on the parameter value measured in the modified output signal produced by that operational module.

After measuring the electrical characteristic of a modified output signal to obtain a parameter value therefrom, the monitoring unit accesses the storage unit and uses the parameter value to cross-reference to a fault threshold associated with that parameter value. The monitoring unit then compares the current performance of the operational module to this fault threshold to determine whether the operational module is functioning properly. The monitoring unit may determine the current performance from the original output signal or from the modified output signal.

Figure 1:
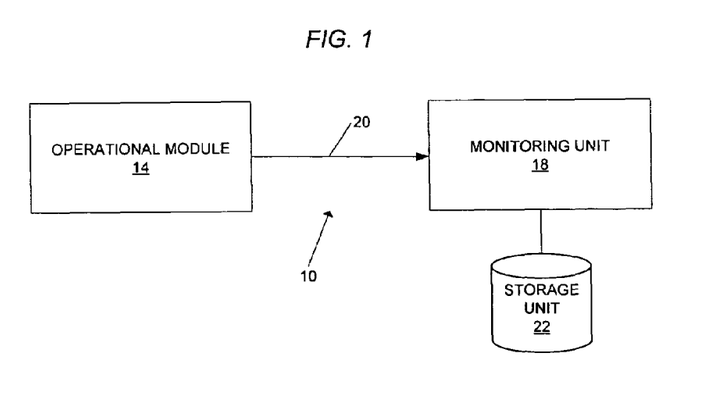
FIG. 1 is a functional block diagram of an embodiment of a system for dynamically determining a fault threshold of an operational module in accordance with the principles of the invention.

FIG. 1 depicts a functional block diagram of an embodiment of a system 10 for dynamically determining a fault threshold for an operational module 14 in accordance with the principles of the invention. In general, an operational module is a subsystem, module, circuit, device, or component that performs a particular function within the system 10. Any one of a plurality of different manufacturers can manufacture the operational module 14; that is, each of the different operational modules produced by the various manufacturers is a suitable candidate for use in the system 10 as the operational module 14. Examples of operational modules include, but are not limited to, fans, blowers, power supplies, disk drives, integrated circuit components, circuit boards, transmitters, receivers, and the like. The operational module 14 also continuously supplies an output signal 20 that directly or indirectly provides a measure of the performance of the operational module 14. The output signal 20 supplied by the operational module can be a digital signal or an analog signal. An electrical characteristic of the output signal 20, or more specifically, a measure of that electrical characteristic, uniquely correlates to the particular model of that operational module.

The system 10 also includes a monitoring unit 18 in communication with a storage unit 22 and with the operational module 14. The monitoring unit 18 is a subsystem, module, device, circuit, or component that monitors the output signal 20 produced by the operational module 14. The monitoring unit 18 can be housed within another module of the system 10 (e.g., a power supply) or it can be a stand-alone module.

The storage unit 22 includes means for storing and organizing data. Examples include, but are not limited to, databases and tables. Various types of memory, persistent and volatile, can be used to implement the storage unit 22, e.g., flash memory, random access memory, and other memory devices. Preferably, the storage unit 22 is housed with or is part of the monitoring unit 18. Stored in the storage unit 22 are associations between parameter values, corresponding to measurements of a particular electrical characteristic of output signals, and fault thresholds.

In brief overview, during operation of the system 10, the monitoring unit 18 receives the output signal 20 from the operational module 14. In one embodiment, a first electrical characteristic of the output signal 20 (e.g., amplitude) is indicative of the model of the operational module 14 and a second electrical characteristic of the output signal 20 (e.g., frequency) is indicative of the performance of the operational module 14. In another embodiment, the output signal 20 comprises a plurality of separate output signals; that is, a first output signal conveys the first electrical characteristic that is indicative of the model and a second output signal conveys the second electrical characteristic that is indicative of the performance of the operational module. In either embodiment, the monitoring unit 18 uses these electrical characteristics to correlate the operational module 14 to a particular model and to evaluate the performance of the operational module 14. More specifically, the monitoring unit 18 uses a measure of the first electrical characteristic to obtain an associated fault threshold from the storage unit 22, and then compares a measure of the second electrical characteristic to this fault threshold to determine if the operational module 14 is operating properly.

Figure 2:
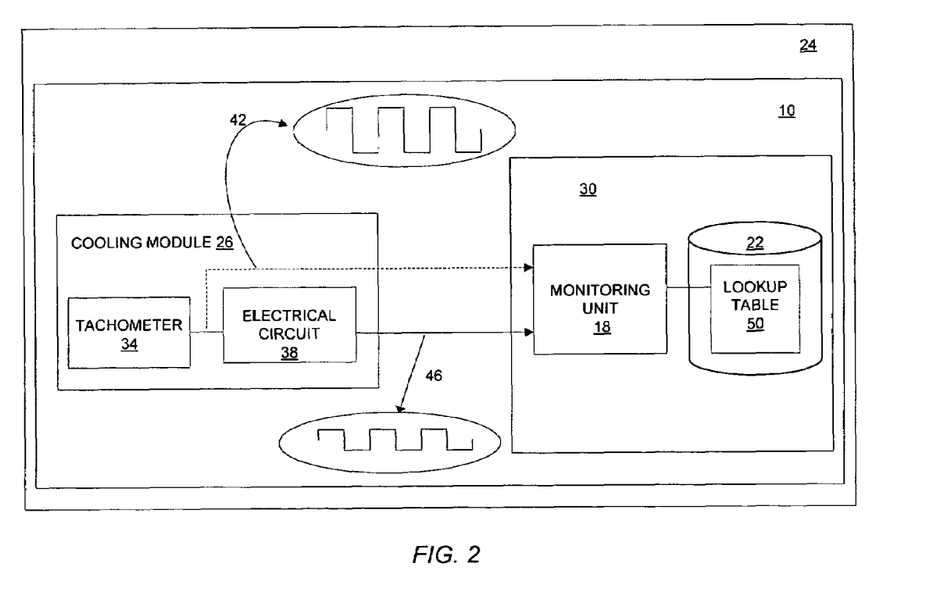
FIG. 2 is a block diagram of the system of FIG. 1, in more detail.
Figure 3:
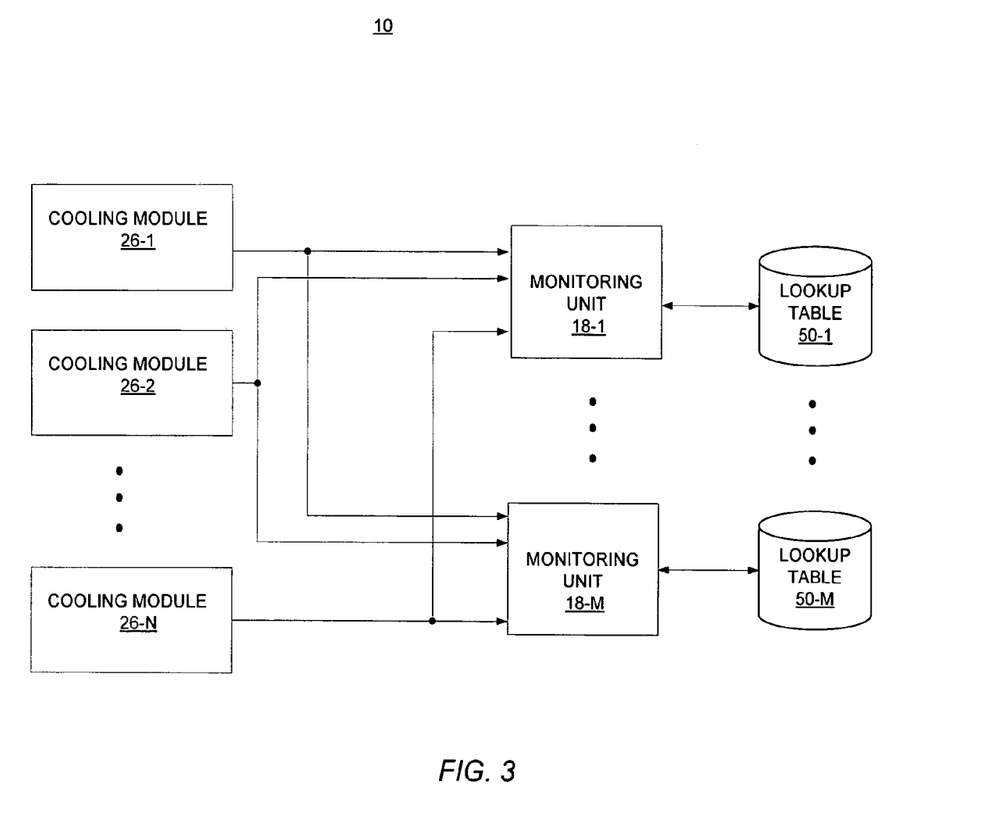
FIG. 3 is a functional block diagram of another system embodying the invention.

FIG. 2 shows a functional block diagram of an exemplary storage enclosure 24 embodying the system 10 of FIG. 1. The storage enclosure 24 has one cooling module 26 and one power supply 30. Here, the cooling module 26 is an embodiment of the operational module 14 of FIG. 1 and the monitoring unit 18 and storage unit 22 of FIG. 1 are part of the power supply 30. In one embodiment, the power supply 30 provides alternating current (AC), and in another embodiment, direct current (DC) to the cooling module 26. The locations of the monitoring unit 18 and storage unit 22 in the power supply 30 are merely exemplary; in other embodiments, the monitoring unit 18 and storage unit 22 can be part of a different unit of the storage enclosure 24, such as a processor board. Further, in another embodiment, the system 10 can have a plurality of cooling modules 26-1, 26-2, 26-N (generally, 26) and a plurality of monitoring units 18-1, 18-M (generally, 18), as shown in FIG. 3, in which each monitoring unit 18 monitors the output signal produced by each cooling module 26, as described in more detail below. Each cooling module 26 in a system having a plurality of cooling modules 26 can be manufactured by the same or by different manufacturers, whereas each monitoring unit 18 in a system having a plurality of monitoring units is generally the same as every other monitoring unit in the system.

Returning to FIG. 2, in one embodiment, the cooling module 26 includes a fan or blower and produces airflow for use in controlling the temperature of the storage enclosure 24. Other embodiments of cooling modules can be used to practice the invention, e.g., those that use other means to cool a system, such as liquid, etc. Each cooling module 26 includes a tachometer 34 that is in communication with an electrical circuit 38. The tachometer 34 generates an output signal 42 that is indicative of the performance of the cooling module 26 (e.g., the rotational speed of the fan blades).

The electrical circuit 38 receives and modifies the output signal 42. The electrical circuit 38 can include one or more active or passive electrical elements, such as resistors, capacitors, inductors, and transistors, for modifying the output signal 42. The types and values of the electrical elements that make up the electrical circuit 38 are determined based on the model of the cooling module 26 and are designed to achieve a particular, unique modification of the output signal 42. The modified output signal produced by the electrical circuit 38 may also be referred to herein as a characterization signal 46.

The storage unit 22 includes a lookup table 50 having one or more entries. Each entry in the table 50 provides an association between a parameter value of the characterization signal 46 (e.g., the amplitude of the signal) and a fault threshold. The monitoring unit 18 is in communication with the electrical circuit 38 in order to receive the characterization signal 46. In one embodiment, the characterization signal 46 provides sufficient information to enable the monitoring unit 18 to correlate the cooling module 26 to a particular model (i.e., to obtain a fault threshold for the particular cooling module) and to evaluate the performance of the cooling module 26. That is, the output signal 42 produced by the tachometer 34 does not need to pass to the monitoring unit 18. In another embodiment, the output signal 42 produced by the tachometer 34 also passes to the monitoring unit 18, and the monitoring unit 18 uses the output signal 42 to measure the performance (e.g., operational speed) of the cooling module 26, while using the characterization signal 46 to determine a fault threshold for the cooling module 26.

Figure 4:
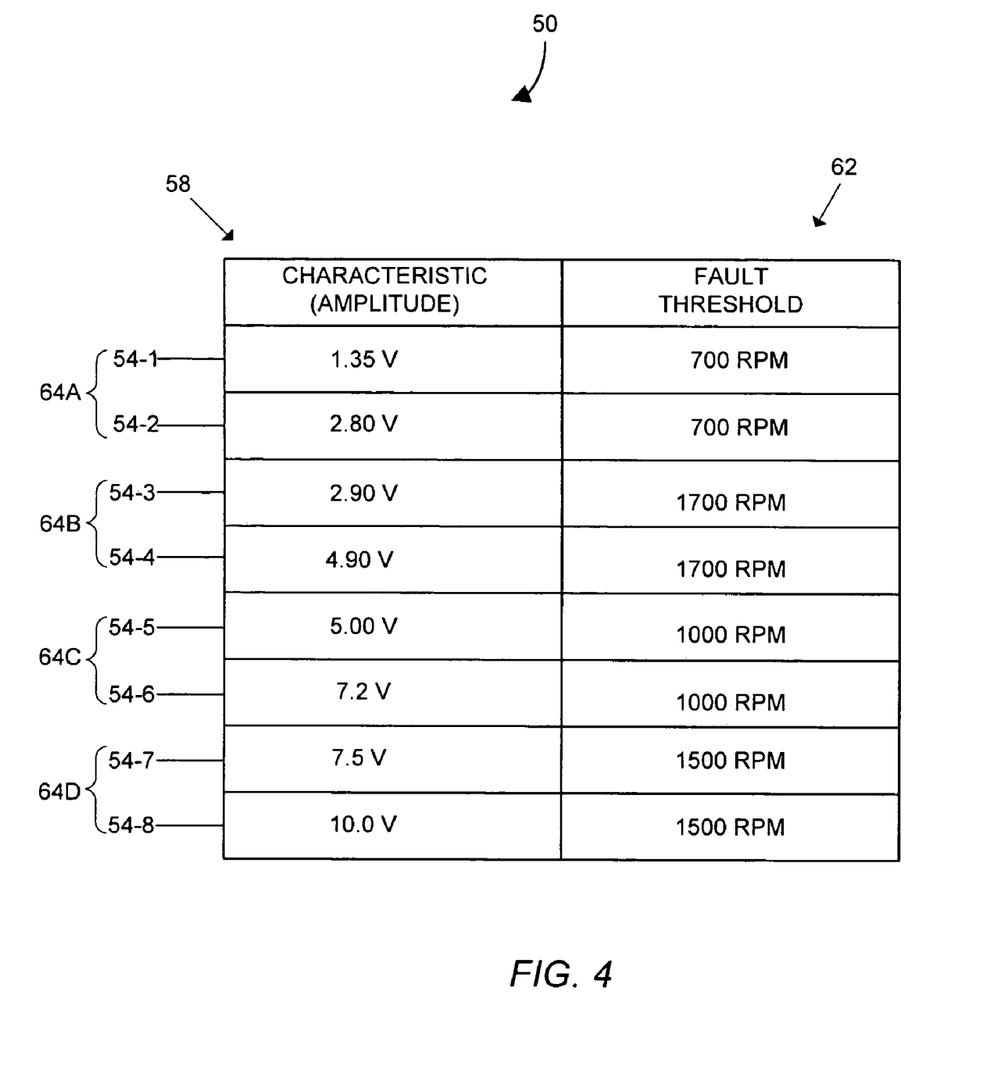
FIG. 4 is a diagram of an embodiment of a lookup table, having entries that associate parameter values with fault thresholds, which can be used in the practice of the invention.

FIG. 4 shows an embodiment of the lookup table 50. Each entry 54-1 through 54-8 (generally, 54) in the lookup table 50 includes a first column 58 for storing a parameter value for an electrical characteristic (e.g., amplitude) and a second column for storing an associated fault threshold. In one embodiment, pairs of entries (e.g., 54-1, 54-2) of the lookup table 50 define a range of parameter values. For example, entries 54-1 and 54-2 define a range 64A of parameter values, here 1.35 volts to 2.80 volts; entries 54-3 and 54-4 define a range 64B; entries 54-5 and 54-6 define a range 64C; and entries 54-7 and 54-8 define a range 64D. Each range 64A, 64B, 64C, 64D (generally, 64) of values is associated with a particular model of cooling module 26 (i.e., manufactured by one or more different manufacturers) and is associated with a fault threshold for the cooling module 26. Using ranges 64 of values is preferred to using single values, because minor fluctuations in the measuring of the electrical characteristic can occur due to various operational conditions.

Referring to FIG. 3 and FIG. 4, during operation the tachometer 34 produces a tachometer signal 42 corresponding to the rotational rate of a fan (or blower) in the cooling module 26. For example, two full cycles of the output signal 42 produced by the tachometer 34 can correspond to one revolution of the fan blade. The electrical circuit 38 receives and modifies the tachometer signal 42 to generate a characterization signal 46. In one embodiment, the electrical circuit 38 causes a change in the amplitude of the tachometer signal 42. Other types of modifications to the tachometer signal 42, such as changing its phase and/or its duty cycle, are applicable without departing from the principles of the invention. The monitoring unit 18 receives the characterization signal 46 and determines a parameter value for this particular electrical characteristic. For example, consider that the monitoring unit 18 comprises a peak detector circuit that determines the amplitude of the characterization signal 46 to be 3.9 volts. The monitoring unit 18 compares this parameter value of the electrical characteristic against the entries 54 that are stored in the lookup table 50. For the present example, the range 64B includes the 3.9-volt measurement and the associated fault threshold is 1700 RPM. The monitoring unit 18 then measures an electrical characteristic of the tachometer signal 42, here its frequency, computes its current rotational rate, and compares the rotational rate to this fault threshold value to determine whether the cooling module 26 is operating as required.

Figure 5:
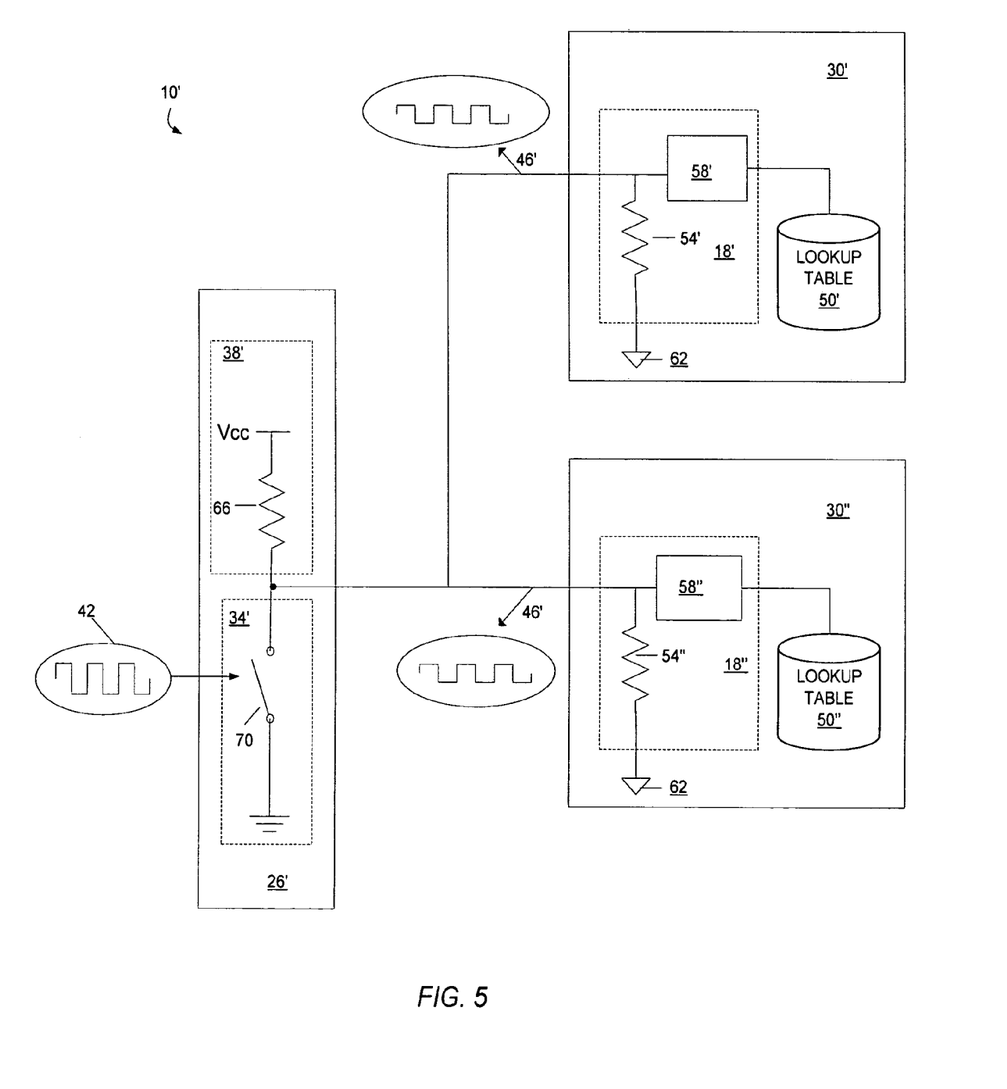
FIG. 5 is a functional block diagram of another embodiment of a system for dynamically determining a fault threshold for an operational module in accordance with the principles of the invention.

FIG. 5 shows a conceptual circuit diagram of an embodiment of a system 10' featuring a cooling module 26' and redundant monitoring units 18', 18" (generally, 18), each being embodied in a respective power supply 30', 30" (generally, 30). Providing redundant power supplies 30', 30" ensures continued operation of the cooling module 26', and other system components, in the event of a fault or failure of one of the power supplies 30. It is to be understood that the monitoring units 18 do not need to be part of a power supply 30 in order to practice the invention. For example, consider a system that does not have redundant power supplies, yet supports redundancy for determining a fault threshold of the cooling module 26'; such a system can have two or more monitoring units 18 and only one power supply 30. In such a system, the redundant monitoring units 18 can be part of another module or subsystem in the system.

The cooling module 26' includes an embodiment of a tachometer 34' in communication with an embodiment of an electrical circuit 38'. Conceptually, the tachometer 34' can be represented as a switch 70 (e.g., a transistor). The switch 70 opens and closes based on a tachometer signal 42 to produces an output pulse train (i.e., a characterization signal 46') that is shaped by the electrical circuit 38' and the monitoring units 18. In this embodiment, the electrical circuit 38' comprises a pull-up resistor 66 that is connected at one end to the output terminal of the switch 70 and at the other end to a power rail Vcc. The particular value of the pull-up resistor 66 depends upon the manufacturer of the cooling module (or upon the particular model of the cooling module 26'—in those instances when the same manufacturer produces different interchangeable versions or models of the cooling module). Each different manufacturer and each different version of cooling module produced by the same manufacturer is assigned a different value of pull-up resistor 66. The particular resistor value assigned is predetermined, as described in more detail below.

In the embodiment shown, each monitoring unit 18', 18" includes a respective pull-down resistor 54', 54" (generally, 54) that is connected to ground 62 at one end and to the output terminal of the tachometer 34' at the other end. Each monitoring unit 18', 18" also includes respective circuitry 58', 58" (generally, 58) that is in communication with the output terminal of the tachometer 34' for receiving the characterization signal 46' and measuring the performance of the cooling module 26' and electrical characteristic (e.g., amplitude) from this characterization signal 46'. Examples of the circuitry 58 of the monitoring unit 18 include, but are not limited to, a peak detector, a filtering circuit, an averaging circuit, a logic circuit, and combinations thereof. Although shown to be in communication with different look-up tables 50', 50" (generally, 50), the redundant monitoring units 18 can share access to the same lookup table.

The pull-down resistor 54 of each monitoring unit 18 and the pull-up resistor 66 of the cooling module 26' combine to form a voltage divider circuit that shapes the amplitude of the characterization signal 46' based on the resistor values assigned to resistors 54 and 66. For example, consider that the power rail Vcc is 12 volts, that the value of the pull-up resistor 66 is 15K ohms, and that the value of each pull-down resistor 54 is 10K ohms. For the purpose of this calculation, consider also that only one monitoring unit 18' is present in the system 10'. The resulting amplitude of the characterization signal 46' is 4.8 volts ((12 v*10K)/(15K+10K)). If the value of the pull-up resistor 66 is 35K ohms, then the resulting amplitude is 2.67 volts ((12 v*10K)/(35K+10K)). The different values of pull-up resistors 66 thus produce different amplitudes for the characterization signal 46'.

When both monitoring units 18', 18" are in the system 10', the parallel resistance of the pull-down resistors 54', 54" is 5K ohms and, using again the 15K ohm pull-up resistor value, results in an amplitude of 3 volts ((12 volts*5K)/(15K+5K)). Note that the value of the pull-down resistor 54 is the same for each monitoring unit 18. For the 35K pull-up resistor value, the resulting amplitude is 1.5 volts ((12 volts*5K)/(35K+ 5K)).

When redundancy is employed in the system 10', consideration is given to the possibility that one of the monitoring units 18 may be removed from the system 10' (e.g., because the power supply 30 fails within which that monitoring unit is embodied). As a result, the pull-down resistor 54 of that monitoring unit 18 does not factor into the shaping of the characterization signal 46'; that is, only the pull-down resistor 54 of the remaining monitoring unit 18 affects the amplitude of the characterization signal 46'. To avoid the possibility that the loss of a monitoring unit may cause a false indicator of the model, the values of the pull-up resistors 66 that are assigned to the various manufacturers are selected so that whether one or two monitoring units 18 are present in the system 10', the resulting amplitude of the characterization signal 46' correlates to the same fault threshold. More specifically (i.e., two monitoring units), in one embodiment the pull-up resistor values are sufficiently spaced apart from each other by at least a factor of two. Embodiments having more than two monitoring units use different factors to achieve non-overlapping resistor-value ranges. In addition, in embodiments without redundant monitoring units, the spacing between resistor values can be smaller than for those embodiments employing redundancy.

For example, consider three different manufacturers of the cooling module 26', one manufacturer being assigned a 6.8K ohm pull-up resistor, a second being assigned a 15K ohm resistor, and a third being assigned a 35K ohm resistor. Each manufacturer produces its version of the cooling module 26' using its assigned pull-up resistor 66, and each version of the cooling module 26' has a specified rotational rate when operating properly. Having the value of the pull-up resistor 66 assigned to a given manufacturer of the cooling module 26' and the specified rotational rate of that cooling module 26' enables the association of a range of parameter values with fault thresholds (as shown in FIG. 4). The following table illustrates how the exemplary pull-up resistor values of 6.8K, 15K, and 35K produce non-overlapping ranges of amplitude. (For determining each range of amplitude values, a pull-down resistor value of 10K ohms in each monitoring unit is used). The lookup table 50 of FIG. 4 applies a guard band to each of the ranges to account for minor fluctuations in measuring the peak amplitude. It is to be understood that the values of the pull-up resistors 66 and pull-down resistors 54 are exemplary; other resistor values or component types that produce non-overlapping amplitude ranges can be used without departing from the principles of the invention.

| Number of monitoring units | 6.8K ohms | 15K ohms | 35K ohms |
| --- | --- | --- | --- |
| One | 7.14 volts | 4.8 volts | 2.67 volts |
| Two | 5.08 volts | 3.0 volts | 1.5 volts |

During operation, the switch 70 and the pull-up resistor 66 of the cooling module 26' and each pull-down resistor 54 of the monitoring units 18 combine to produce a characterization signal 46' from the tachometer signal 42 produced by the tachometer 34. The circuitry 58 of each monitoring unit 18 measures the peak amplitude of the characterization signal 46'. Each monitoring unit 18 compares the peak amplitude of the characterization signal 46' to the various ranges 64 of values (FIG. 4) that are stored in the lookup table 50. The monitoring unit 18 determines the range 64 into which the measured peak amplitude falls and obtains an associated fault threshold. Selecting the values for the pull-up resistor 66, with sufficient spacing between valid resistor values, as described previously, can prevent the characterization signal 46' from leading to an incorrect determination of fault threshold. The circuitry 58 of the monitoring unit 18 also determines the rotational rate of the cooling module 26' from the characterization signal 46' and compares this rotational rate to the obtained fault threshold to determine whether the cooling module 26' is functioning as required. If the cooling module 26' is not functioning as required, a control signal can be sent to set an alarm or to adjust the speed of the cooling module 26' or other cooling module(s) accordingly.

Figure 6:
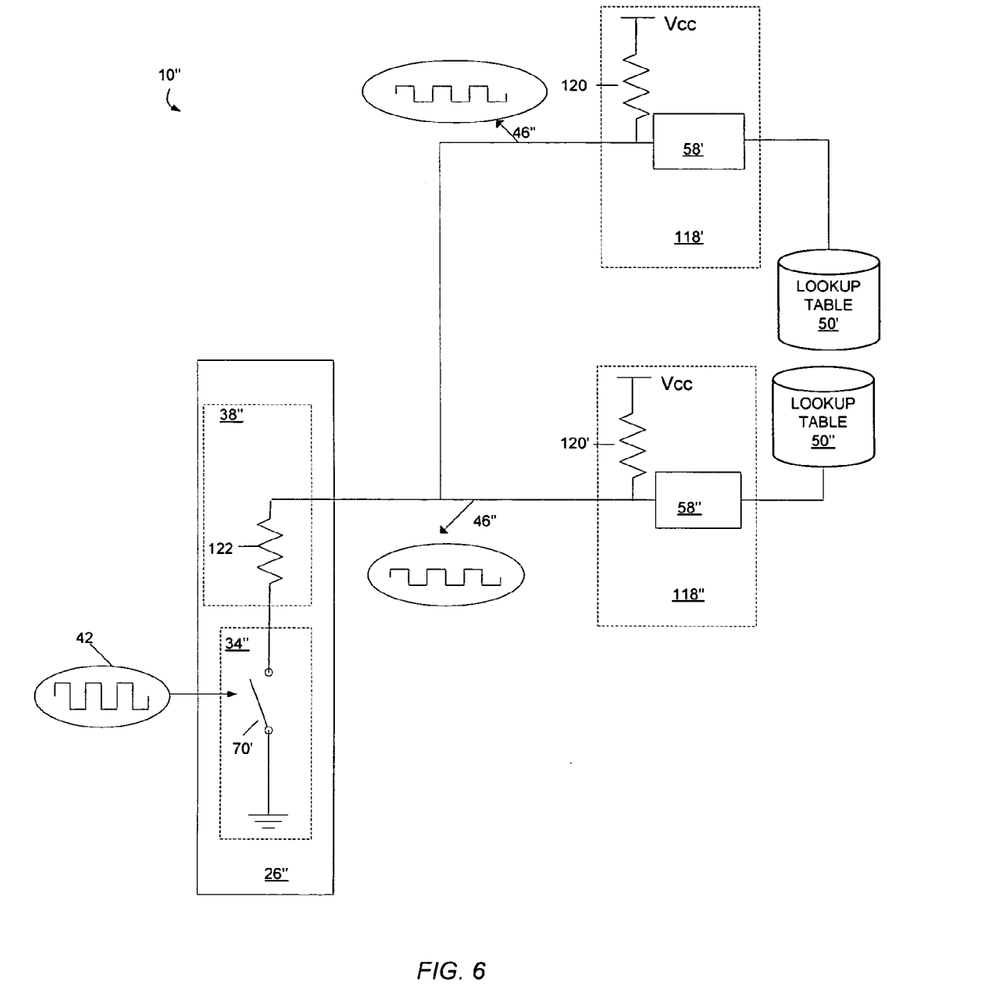
FIG. 6 is a functional block diagram of still another embodiment of a system for dynamically determining a fault threshold for an operational module in accordance with the principles of the invention.

FIG. 6 shows a conceptual circuit diagram of another embodiment of a system 10' featuring a cooling module 26" and redundant monitoring units 118', 118" (generally, 118). In this embodiment, each monitoring unit 118', 118" includes a pull-up resistor 120, 120' and the electrical circuitry 38" has a series resistor 122 in communication with the output terminal of the tachometer 34". The principles for assigning values to manufacturers for the pull-up resistor 66, described above in connection with FIG. 5, apply also to the assigning of resistor values for the series resistor 122. This series resistor 122 in combination with the pull-up resistors 120 of the monitoring units 118 produces a voltage divider that shapes the characterization signal 46". Similarly, the monitoring units 118 determine the fault threshold from the characterization signal 46" similar to that described above. Here, the redundant monitoring units 118 share access to duplicate look-up tables 50', 50" to determine a fault threshold.

The ability of the monitoring units to distinguish between different models of cooling modules can be used to control the speed of a given cooling module. For example, consider a variable-speed cooling module having an input wire that controls the voltage going to the fan or blower, in addition to a ground wire, a power wire, and a tachometer output wire.

Based on a measurement of the amplitude of the characterization signal, a monitoring unit can determine the model of the cooling module and send signals over the voltage input wire to increase or decrease the cooling module's rotational rate. For this type of application, the look-up table can associate other information with each parameter value, such as minimum rotational rate and maximum rotational rate for a given cooling module. An occasion for increasing the rotational rate of one cooling module may be that the monitoring unit has determined that another cooling module in the system is degrading or failing. Thus, by increasing the rotational rate, the system can automatically compensate for the loss of airflow because of the degrading module.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for determining a fault threshold for an operational module, the system comprising:
    a storage unit maintaining a mapping of parameter values to fault thresholds for different production models of operational modules, each parameter value mapping to a fault threshold for one of the different production models;
    an operational module of a particular production model having circuitry for producing a characterization signal with an electrical characteristic from which a parameter value may be derived, the circuitry being configured such that the parameter value derived from the electrical characteristic maps uniquely, in accordance with the mapping maintained by the storage unit, to the particular production model of the operational module and distinguishes the particular production model of the operational module from other production models of the operational module; and
    a monitoring unit in communication with the operational module to receive the characterization signal and with the storage unit, the monitoring unit measuring the electrical characteristic of the characterization signal to derive the parameter value therefrom and accessing the mapping maintained by the storage unit to obtain therefrom the fault threshold to which the derived parameter value maps, thereby obtaining the fault threshold for the operational module.

2. The system of claim 1, wherein the operational module comprises a cooling module.

3. The system of claim 2, wherein the cooling module has a variable speed and wherein the monitoring unit sends a control signal to the cooling module to adjust the speed of the cooling module in response to the characterization signal.

4. The system of claim 1, wherein the storage unit maintains at least one range of parameter values and associates each range of parameter values with a different fault threshold.

5. The system of claim 1, wherein the circuitry for producing the characterization signal comprises a resistor having a value uniquely associated with the particular production model of the operational module in order for the parameter value derived from the electrical characteristic of the characterization signal to be unique to the particular production model of the operational module.

6. The system of claim 5, wherein a value of the resistor uniquely associated with a first production model of the operational module is at least a factor of two greater than a value of the resistor uniquely associated with a second production model of the operational module.

7. The system of claim 1, wherein the electrical characteristic of the characterization signal is an amplitude of the characterization signal.

8. The system of claim 1, further comprising at least one other monitoring unit in communication with the operation module for receiving the characterization signal of the operation module and for measuring the electrical characteristic of the characterization signal to derive a parameter value therefrom.

9. The system of claim 8, wherein the storage unit maintains at least one range of parameter values and associates each range of parameter values with a different fault threshold, each range of parameter values being separated from each adjacent range of parameter values by a gap of sufficient size to avoid an incorrect determination of the fault threshold when one of the monitoring units is removed from the system.

10. The system of claim 1, wherein the operational module generates an output signal indicative of a performance of the operational module, and the circuitry modifies the output signal to produce the characterization signal.

11. A method of determining a fault threshold for an operational module, the method comprising:
    maintaining a mapping of parameter values to fault thresholds for different production models of operational modules, each parameter value mapping to a fault threshold for one of the different production models;
    producing, by an electrical circuit of the operational module, a characterization signal having an electrical characteristic from which a parameter value may be derived;
    configuring the electrical circuit of the operational module such that the parameter value derived from the electrical characteristic maps uniquely, in accordance with the mapping of parameter values to fault thresholds, to a particular production model of the operational module and distinguishes the particular production model of the operational module from other production models of the operational module;
    measuring the electrical characteristic of the characterization signal to derive the parameter value therefrom; and
    obtaining, from the mapping of parameter values to fault thresholds, the fault threshold to which the derived parameter value maps, thereby obtaining the fault threshold for the operational module.

12. The method of claim 11, wherein the step of maintaining includes maintaining at least one range of parameter values and associating each range of parameter values with a different fault threshold.

13. The method of claim 11, further comprising sending a control signal to the operational module to adjust a speed of operation of the operational module in response to the characterization signal.

14. The method of claim 11, further comprising associating a different electrical circuit used to produce the characterization signal with each different production model of the operational module.

15. The method of claim 14, wherein each electrical circuit includes a resistor, and wherein the resistor value associated with one production model of the operational module is greater in value by at least a factor of two than the resistor value associated with a different production model of the operational module.

16. The method of claim 11, wherein the step of measuring the electrical characteristic comprises determining an amplitude of the characterization signal.

17. The method of claim 11, further comprising the step of identifying a manufacturer of the operational module based on the parameter value derived from the electrical characteristic of the characterization signal.

18. The method of claim 11, further comprising the step of identifying the particular production model of the operational module based on the parameter value derived from the electrical characteristic of the characterization signal.

19. The method of claim 11, further comprising the steps of:
generating, by the operational module, an output signal indicative of a performance of the operational module; and
modifying, by the electrical circuit of the operational module, the output signal to produce the characterization signal.

20. An apparatus for determining a fault threshold for an operational module, the apparatus comprising:
means for maintaining a mapping of parameter values to fault thresholds for different production models of operational modules, each parameter value mapping to a fault threshold for one of the different production models;
means for producing a characterization signal with an electrical characteristic from which a parameter value may be derived, the means for producing being configured such that the parameter value maps uniquely, in accordance with the mapping of parameter values to fault thresholds, to a particular production model of the operational module and distinguishes the particular production model of the operational module from other production models of the operational module;
means for measuring the electrical characteristic of the characterization signal to derive the parameter value therefrom; and
means for accessing the mapping of parameter values to fault thresholds to obtain therefrom the fault threshold to which the derived parameter value maps, thereby obtaining the fault threshold for the operational module.

21. The apparatus of claim 20, further comprising means for sending a control signal to the operational module to adjust a speed of operation of the operational module in response to the characterization signal.

22. The apparatus of claim 20, wherein the means for producing the characterization signal includes an electrical circuit that is uniquely associated with the particular production model of the operational module.

23. The apparatus of claim 20, further comprising means for determining a speed of operation of the operational module from the characterization signal.

24. A system for determining a fault threshold of an operational module according to a model of the operational module, comprising:
an operational module having circuitry for producing a characterization signal with an electrical characteristic that uniquely correlates to a model of the operational module;
a storage unit maintaining an association between at least one parameter value and a fault threshold;
a monitoring unit in communication with the operational module to receive the characterization signal and with the storage unit, the monitoring unit measuring the electrical characteristic of the characterization signal to derive a parameter value therefrom and accessing the storage unit to determine the fault threshold associated with the derived parameter value; and
at least one other monitoring unit in communication with the operation module for receiving the characterization signal of the operation module and for measuring the electrical characteristic of the characterization signal to derive a parameter value therefrom,
wherein the storage unit maintains at least one range of parameter values and associates each range of parameter values with a different fault threshold, each range of parameter values being separated from each adjacent range of parameter values by a gap of sufficient size to avoid an incorrect determination of the fault threshold when one of the monitoring units is removed from the system.

* * * * *